(12) United States Patent
Hilberer

(10) Patent No.: US 7,821,154 B2
(45) Date of Patent: Oct. 26, 2010

(54) DEVICE AND METHOD FOR CONTROLLING AN ELECTRIC PARKING BRAKE OF A UTILITY VEHICLE

(75) Inventor: Eduard Hilberer, Hockenheim (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 163 days.

(21) Appl. No.: 12/065,868

(22) PCT Filed: Sep. 6, 2006

(86) PCT No.: PCT/EP2006/008661

§ 371 (c)(1),
(2), (4) Date: Dec. 9, 2008

(87) PCT Pub. No.: WO2007/028579

PCT Pub. Date: Mar. 15, 2007

(65) Prior Publication Data

US 2009/0206658 A1      Aug. 20, 2009

(30) Foreign Application Priority Data

Sep. 6, 2005    (DE) .................. 10 2005 042 304

(51) Int. Cl.
*B60L 3/00* (2006.01)
*B60L 1/00* (2006.01)
(52) U.S. Cl. ........................................ 307/9.1
(58) Field of Classification Search ............ 307/9.1
See application file for complete search history.

(56) References Cited

U.S. PATENT DOCUMENTS 5,239,520 A    8/1993   Arnold 6,144,312 A    11/2000  Will
6,393,571 B1   5/2002   Huckfeldt et al.

(Continued)

FOREIGN PATENT DOCUMENTS

DE      39 26 178 A1     2/1991

(Continued)

OTHER PUBLICATIONS

"Vehicle Regulations", WABCO, Edition 2004, in particular pp. 270, 271. (Three (3) pages).

(Continued)

*Primary Examiner*—Jared J Fureman
*Assistant Examiner*—Dru M Parries
(74) *Attorney, Agent, or Firm*—Crowell & Moring LLP

(57) ABSTRACT

A device for controlling an electric parking brake of a utility vehicle includes an electronic control unit and a manual control unit that communicates with the electronic control unit and via which driver requests depending on the type of actuation of the manual control unit can be transmitted to the electronic control unit. The electronic control unit is adapted to process signals of the manual control unit when the ignition is switched on. The manual control unit is adapted to output in at least one mode of operation a wake-up signal to the electronic control unit. The electronic control unit is adapted to process, once having received a wake-up signal, at least one additional signal of the manual control unit even if the ignition of the utility vehicle is switched off.

12 Claims, 3 Drawing Sheets

U.S. PATENT DOCUMENTS

2005/0023898 A1   2/2005   Eckert et al.

FOREIGN PATENT DOCUMENTS

| DE | 197 15 880 C1 | 7/1998 |
| DE | 100 61 054 A1 | 7/2002 |
| DE | 103 30 451 B3 | 9/2004 |
| DE | 103 33 966 A1 | 2/2005 |
| DE | 103 53 056 A1 | 6/2005 |
| DE | 10 2005 002 679 A1 | 8/2005 |
| EP | 1 038 212 B1 | 9/2000 |
| WO | WO 02/46014 A1 | 6/2002 |

OTHER PUBLICATIONS

ECE-R13: ECE-Regelung Bremsen, http://bmvbs.de/static/ECE/R-13-Bremsen-Tell-I.pdf and http://de.wikipedia.org/wiki/ECE-Regelungen#Verzeichnis_der_ECE-Regelungen. (Ten (10) pages).

"EBS (EPB)- Elektronisch geregeltes Bremssystem", WABCO, Edition 1998. (Three (3) pages).

"Product Specification—Specification of EBS1C for trucks and tractors and EBS1C with VSC only for tractors with Full Air Braking Systems and 4S/4M System", WABCO. (Six (6) pages).

"Brake signal transmitter", WABCO, serial No. 480 003 004 0, as mentioned on 4th page of C5. (One (1) page).

"Central module", WABCO, No. 446,135,042 0, as mentioned on $4^{th}$ page of C5. (One (1) page).

"Brake pattern", WABCO 841,100,520 0, as mentioned on $5^{th}$ page of C5. (One (1) page).

German-language Opposition dated Oct. 2, 2009 (Twenty-one (21) pages).

German-language Opposition dated Oct. 7, 2009 (Two (2) pages).

International Search Report dated Nov. 30, 2006 including English translation (Four (4) pages).

DEVICE AND METHOD FOR CONTROLLING AN ELECTRIC PARKING BRAKE OF A UTILITY VEHICLE

CROSS-REFERENCE TO RELATED APPLICATIONS

This application is the national phase filing of PCT Application No. PCT/EP2006/008661, filed on Sep. 6, 2006, which claims priority to German Patent Application Nos. 10 2005 042 304.3 filed Sep. 5, 2005, filed Sep. 6, 2005 the disclosures of which are incorporated by reference herein.

This application contains subject matter related to copending U.S. patent application Ser. Nos. 12/065,810, filed Mar. 5, 2008, and 12/065,812, filed Mar. 5, 2008.

BACKGROUND AND SUMMARY OF THE INVENTION

The invention relates to a device for controlling an electric parking brake of a utility vehicle having an electronic control unit and a manual control unit, which communicates with the electronic control unit and by which driver's requests, which are dependent on the type of activation of the manual control unit can be transmitted to the electronic control unit. The electronic control unit is embodied such that it further processes signals of the manual control unit if the ignition of the utility vehicle is switched on.

The invention also relates to a method for controlling an electric parking brake of a utility vehicle having an electronic control unit and a manual control unit which communicates with the electronic control unit and by which driver's requests, which are dependent on the type of activation of the manual control unit are transmitted to the electronic control unit if the ignition of the utility vehicle is switched on.

Such devices and methods are becoming increasingly important in relation to the operation of utility vehicles. For the further development of the systems, emphasis is placed on various aspects, in particular the operating comfort and safety.

DE 103 53 056 A1 discloses a manual control unit in which great value is placed on the aforesaid aspects. With respect to safety, it is proposed in particular that it be possible to release the electric parking brake only if two activation elements, that is to say not only one activation element, are activated. Furthermore, the individual switches, which are activated by the operator control elements are configured in a redundant way in the manual control unit. Furthermore, mention is also made of the possibility of initiating a test function by use of the manual control unit, specifically releasing the braking a trailer in order to determine whether the parking brake of the towing vehicle alone is able to stop the entire train. The driver of a vehicle is advised to use this test function, in a particular when parking the vehicle on an incline.

Since an electric parking brake is actuated by an electronic control unit, it is necessary for the ignition of the utility vehicle to be switched on for the execution of functions in general. This is to be welcomed in terms of the safety of the utility vehicle since in this way it is impossible for any unintended actions, in particular release, to be brought about when the ignition is switched off. However, with respect to the operating comfort, the previous concept is capable of being improved. If, specifically, the driver forgets to close the parking brake during the switched on time of the ignition, it is no longer possible for him to subsequently close it when the ignition is switched off. He must first switch the ignition on again in order to carry out the desired action.

The invention is based on the object of making available a safe solution with respect to the control of an electronic parking brake, which solution entails improved operating comfort, in particular with respect to the dependence of the implementation of driver's wishes on the switched-on state of the ignition.

The invention builds on the prior art in that the manual control unit is embodied in such a way that in at least one type of activation it outputs a wakeup signal to the electronic control unit, and that the electronic control unit is also embodied in such a way that subsequent to the reception of a wakeup signal, it further processes at least one further signal of the manual control unit even when the ignition of the utility vehicle is switched off. It is, therefore, possible to interrupt the voltage supply of the electronic control unit with the ignition switched off. This is useful with respect to the electrical energy budget of the utility vehicle and, furthermore, is also appropriate in terms of safety technology since when the ignition is switched off, it is usually not possible for unintended actions to occur. However, it is also possible to provide that a wakeup signal on the basis of which it is possible to operate the parking brake despite the ignition being switched off can be output via the manual control unit.

This is useful, in particular, in the context in which the manual control unit is embodied such that it outputs a wakeup signal if an activation element for closing the parking brake is activated on the manual control unit. The driver can, therefore, still close the parking brake after the ignition has been switched off without further measures by virtue of the fact that he specifically activates the manual control unit in the conventional way, that is to say in the way in which he also uses it to close the parking brake when the ignition is switched on. During this operating procedure, a wakeup signal, which permits subsequent processing of a closing signal by the electronic control unit, is output automatically. Under certain circumstances it is, however, also desirable for the device according to the invention to be configured such that a release of the parking brake is made possible despite the ignition being switched off. In this case, the outputting of the wakeup signal is tied to the activation of the activation element for the release of the parking brake. This may be useful in particular in utility vehicles for conveying passengers; such a possible situation is, for example, when a vehicle comes to a standstill on a grade crossing. It is then highly advantageous if it is possible to bring about release of the parking brake independently of the switched-on state of the ignition or of the application of the ignition voltage to the electronic control unit. If the outputting of the wakeup signal is, however, tied to the outputting of the release signal, further safety measures have to be taken in order to avoid an unintended release of the parking brake from occurring.

It is in particular useful that the electronic control unit is embodied such that, when the ignition of the utility vehicle is switched off, it further processes precisely one further signal of the manual control unit subsequent to the reception of a wakeup signal. For the general case for which the present invention is configured, specifically that the ignition is switched off before the parking brake is closed, it is sufficient to permit the further processing of a single further signal after the reception of the wakeup signal by the electronic controller. Since the parking brake is closed after the further processing of the one further signal, the vehicle is therefore placed in a safe state and further signal processing is superfluous and undesired for technical safety reasons.

The invention is also usefully embodied in that the wakeup signal can be fed to a microcontroller via an analog/digital converter and a switching logic, in that, the electronic controller is configured such that, in addition to the wakeup signal, an "ignition on" signal can be fed to the switching logic. An output signal of the switching logic causes a switch for supplying voltage to the microcontroller to close when the wakeup signal and/or the "ignition on" signal are supplied.

The configuration of the present invention in terms of circuitry allows the wakeup signal and the "ignition on" signal to be treated with equal priority with respect to the switching logic. However, since the microcontroller is also informed of the presence of the wakeup signal, the electronic controller can ultimately operate with knowledge of the presence of this wakeup signal within the sense of the present invention, that is to say, for example, it can return to its voltageless state immediately after the closing process of the parking brake has been carried out. If the wakeup signal is suitably fed to the switch for supplying voltage to the microcontroller, it is, however, also possible to ensure independently of the microcontroller that only a limited time window is available after the outputting of the wakeup signal in order to bring about the further function, that is to say in particular the closing function.

In conjunction with the aforementioned switch for supplying voltage, it is also useful that the switch for supplying voltage to the microcontroller can be made to close as a result of an output signal of the microcontroller. This output signal of the microcontroller relates, in particular, to running on of the control device, as a result of which it is possible to carry out or to prevent certain functions in certain situations, even after the ignition has switched off. For example, the closing of the parking brake can be still permitted independently of the presence of the wakeup signal for several seconds after the switching off of the ignition.

The invention is based on the generic method in that the manual control unit outputs a wakeup signal to the electronic control unit in at least one type of activation, and in that, subsequent to the reception of a wakeup signal, the electronic control unit continues to further process at least one further signal of the manual control unit even when the ignition of the utility vehicle is switched off. As a result, the advantages and particular features of the device according to the invention can also be implemented within the scope of a method.

This is developed in a particularly advantageous way by virtue of the fact that the manual control unit outputs a wakeup signal if an activation element for closing the parking brake is activated on the manual control unit.

Furthermore, it is possible to provide that, when the ignition of the utility vehicle is switched off, the electronic control unit further processes precisely one further signal of the manual control unit subsequent to the reception of a wakeup signal.

The invention is particularly usefully used in that the further signal is a closing signal for closing the parking brake.

The method according to the invention is advantageously developed in that the wakeup signal is fed to a microcontroller via an analog/digital converter and a switching logic, in that, in addition to the wakeup signal, an "ignition on" signal is fed to the switching logic, and in that an output signal of the switching logic causes a switch for supplying voltage to the microcontroller to close when the wakeup signal and/or the "ignition on" signal are fed.

Furthermore, it is possible to provide that closing of the switch for supplying voltage to the microcontroller is brought about as a result of an output signal of the microcontroller.

BRIEF DESCRIPTION OF THE DRAWINGS

The invention will now be explained by way of example by means of particularly preferred embodiments and with reference to the appended drawings.

DETAILED DESCRIPTION OF THE DRAWINGS

In the following description of the preferred embodiments of the invention, identical reference symbols denote identical or comparable components.

Figure 1:
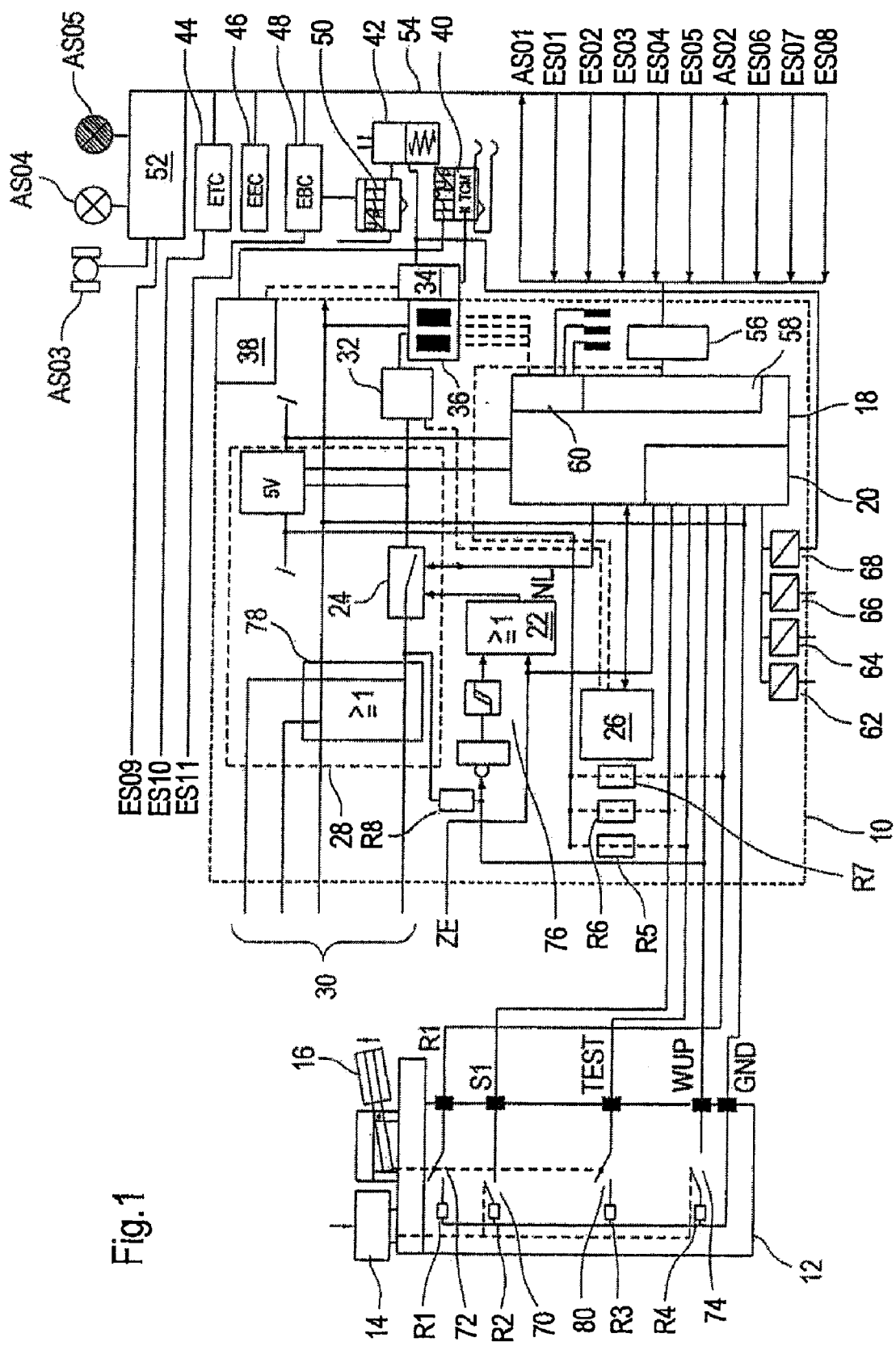
FIG. 1 is a circuit diagram according to the invention in a schematic illustration of a first embodiment of an activation device for a manual control unit.

FIG. 1 is a circuit diagram explaining a device with a schematic illustration of a first embodiment of an activation device for a manual control unit. An electronic control unit (ECU) 10 is illustrated. The ECU 10 contains a microcontroller 18 and a watchdog timer 26. The watchdog timer 26 is used to monitor the microcontroller 18, and it contains a second microcontroller for this purpose. Redundancy can be made available owing to the presence of two microcontrollers.

Furthermore, a power unit 28 is provided, to which voltage can be fed from a double, that is to say redundant, voltage supply. The power unit 28 supplies, in particular, the microcontroller 18 with a stable voltage of preferably 5 V. A shutdown relay 32 is also provided. The shutdown relay is able to place the system, in particular the solenoid valves 36 which transmit the switching functions of the parking brake pneumatics 34, in a secured state, initiated by the watchdog timer 26.

An EAC (electronic air conditioning system) pneumatic interface 38 and devices in the periphery of the electronic control unit 10 are also illustrated. For example, the EAC pneumatic interface 28 is, apart from its connection to the parking brake pneumatics 34, also connected to the trailer control module 40. The trailer control module 40 is also connected to the parking brake pneumatics 34, in particular in order to implement a test function, which will be described below. There is a further connection of the parking brake pneumatics 34 to the spring-loaded cylinders 42 of the parking brake, one of which is illustrated by way of example.

Further peripheral components are an electronic transmission controller (ETC) 44, an electronic engine controller (EEC) 46 and an electronic brake controller (EBC) 48. The electronic brake controller 48 is connected to a modulator 50 by which the pressure in the spring-loaded cylinders 42 can be changed. Furthermore, a central electronic control unit 52 is provided, which can also be implemented within the scope of a vehicle control computer or central on-board computer. The central electronic controller 52 receives, for example, signals ES09 which characterize the state of the doors and the occupancy of the seats. Relevant output signals in the context of the present invention are, for example, a parking signal AS03, a warning or fault signal AS04 and a stop signal AS05, which is output, for example, when the handbrake is pulled on during the stop and go mode.

The electronic transmission controller 44 receives, for example, signals ES10 which characterize the state of the transmission and state of the clutch, the selected gear speed and the rotational speed of the cardan shaft. The electronic brake controller 48 receives, for example, signals ES11 relating to the brake pedal situation and the service brake pressure. The aforesaid control units 44, 46, 48, 52 are connected via a CAN bus 54 to a CAN interface 56 of the electronic control unit 10. Via this CAN interface 56, a plurality of input signals can be transmitted to the microcontroller 18 via its CAN interface 58. Output signals can also be output.

The following signals, inter alia, are possible:
ES01: A request for activation of the electric parking brake.
ES02: The vehicle speed.
ES03: The position of the accelerator pedal and a signal from an inter-vehicle distance controller.
ES04: A brake pedal position.
ES05: A state of the electronic transmission controller, in particular with respect to deceleration.
ES06: The state of the transmission and of the clutch, which are output by the electronic transmission controller.
ES07: The wheel speed.
ES08: The state of the electronic engine controller.
Possible output signals are, in particular:
AS01: a state signal which is output to the on-board diagnostic and refers to the electric parking brake.
AS02: a request from the electronic brake controller for assistance to be provided to the service brake.

In addition to the CAN interface 58, the microcontroller 18 also has direct digital and/or analog outputs 60, in particular for actuating solenoids which provide access to the pneumatic controller.

The electronic control unit 10 also has pressure sensors 62, 64, 66, 68. The pressure sensors 62, 64 sense the pressure in the service brake circuits. The pressure sensor 66 is assigned to the trailer brake system. The pressure sensor 68 is used to measure the pressure in the spring-loaded cylinders.

Further components are provided which relate to the operation of the manual control unit 12 and which are explained with reference to the following description of the method of operation of the manual control unit 12 and its interplay with the electronic control unit 10.

The manual control unit 12 has two operator control elements 14, 16. The operator control element 14 is used to close the parking brake by pressing, while the operator control element 16 is used to open the parking brake by pulling. For the purpose of closing the parking brake, the operator control element 14 is coupled to a switch 70. If this switch is closed, a signal S1 is output to the analog/digital converter 20 of the microcontroller 18. For the purpose of releasing the parking brake, the operator control element 16 is coupled to the switch 72. If the switch 72 is closed, a signal R1 is output to the analog/digital converter 20 of the microcontroller 18.

In addition to its coupling to the switch 70, the activation element 14 is, however, also coupled to the switch 74. The switch 74 is used to generate a wakeup signal WUP, which is also output to the analog/digital converter 20 of the microcontroller 18. The wakeup signal WUP is, however, also fed to a Schmitt trigger circuit 76. The output signal of the Schmitt trigger circuit 76 is fed to a switching logic 22, which outputs an output signal whenever at least one input signal is present. An "ignition on" signal ZE, that is to say in the simplest case a voltage which is present whenever the ignition is switched on, is also fed to the switching logic 22. The output signal of the switching logic 22 influences a switch 24, which is integrated into the power unit 28. If either the "ignition on" signal ZE or the wakeup signal WUP is present, the switch 24 is closed so that the parking brake system, and in particular the microcontroller 18, are supplied with a voltage. The double supply voltage 30 is, for this purpose, fed within the power unit 28 via a coupling element 78, which generally ensures that the higher voltage of the redundant voltage supply 30 is used to supply the parking brake.

In a similar way to how the switch 74 for generating the wakeup signal WUP is assigned to the activation element 14 as well as being coupled to the switch 70 for closing the parking brake system, the switch 80 is assigned to the activation element 16 for releasing the parking brake as well as to the switch 72. When this switch 80 is closed, a signal TEST is generated, which is fed to the analog/digital converter 20 of the microcontroller 18 so that on this basis it is possible to check whether the towing vehicle alone is able to stop the entire vehicle train composed of a towing vehicle and trailer. The switch 80 is advantageously also used as a redundancy switch for the switch 72. In the same way, the switch 74 can be used as a redundancy switch for the switch 70.

Furthermore, resistors R1, R2, R3, R4, R5, R6, R7 and R8 are also provided in the manual control unit 12 and the electronic control unit 10 and are dimensioned in such a way that the suitable signals are fed to the microcontroller 18 and the Schmitt trigger circuit 76. For example, through the closing of the switch 72, the input of the analog/digital converter 20 of the microcontroller 18, which is connected to said switch, is connected to ground GND via the resistor R1 so that as a result a signal is generated. When the switch 72 opens, the corresponding input is connected again to the positive potential of the power unit 28 via the resistor R7.

Figure 2:
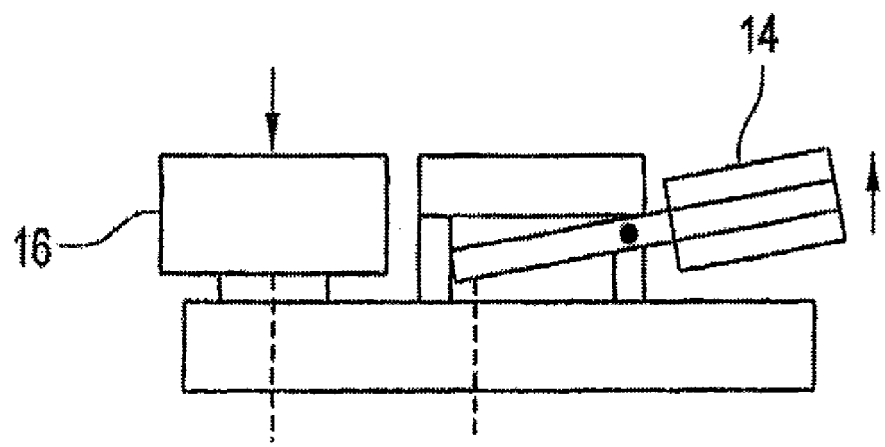
FIG. 2 shows a second embodiment of an activation device for a manual control unit.

As in the embodiment according to FIG. 1 in which the parking brake is closed by pressing and opened by pulling, in the activation device according to FIG. 2 there is provision for the parking brake to close by pulling the activation element 14 and to open by pressing the activation element 16.

Figure 3:
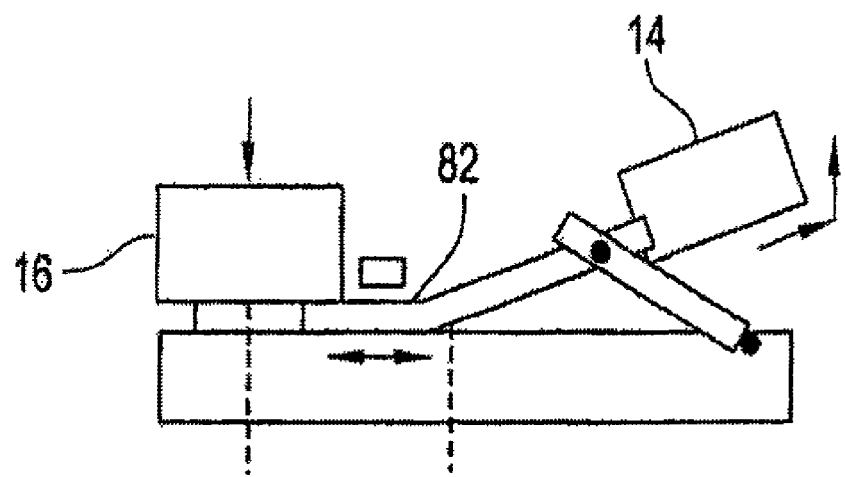
FIG. 3 shows a third embodiment of an activation device for a manual control unit.

In FIG. 3 also, the parking brake is closed by pulling the activation element 14 and opened by pressing the activation element 16. A bolt 82 is additionally provided, which bolt 82 prevents the pressing of the activation element 16 if the activation element 14 is not pulled at the same time. In this way, the parking brake can be released only if both activation elements 14, 16 are activated simultaneously. This provides additional safety.

Figure 4:
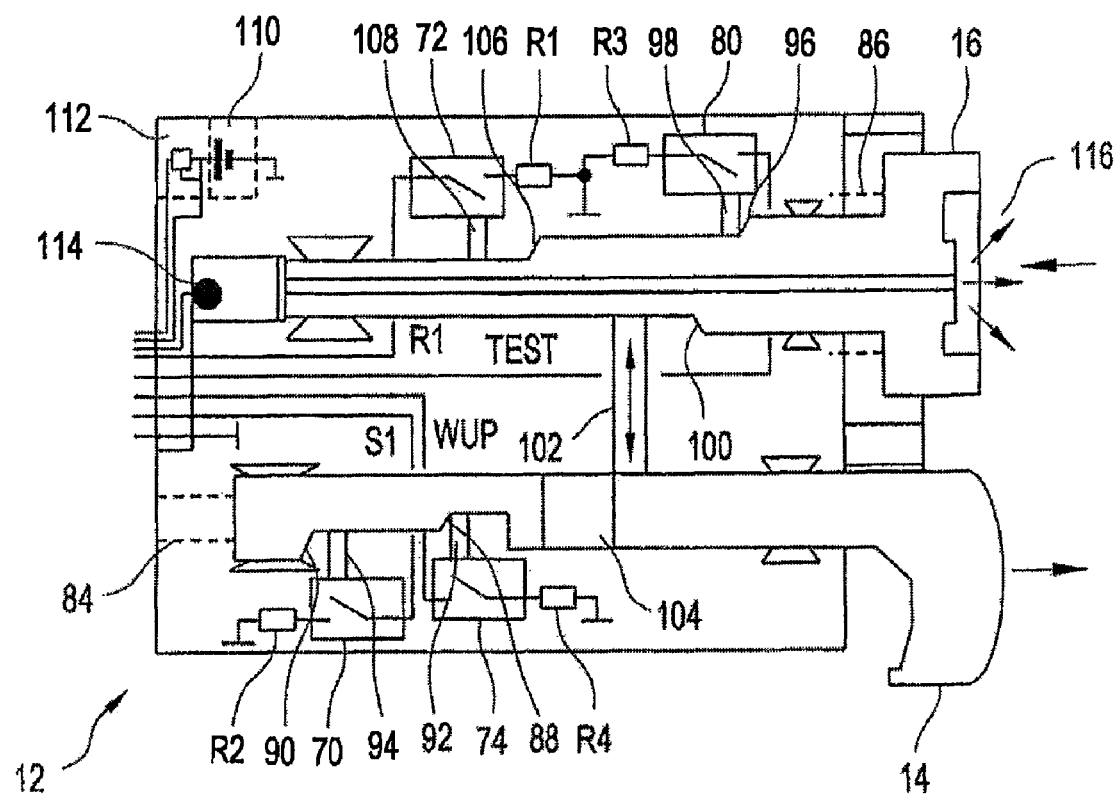
FIG. 4 is a schematic illustration explaining a manual control unit which can be used within the scope of the present invention.

FIG. 4 is a schematic illustration of a manual control unit which can be used within the scope of the present invention. The manual control unit 12 has an activation element 14, which triggers switching functions by pulling, and an activation element 14, which triggers switching functions by pressing. The activation element 14 is directly or indirectly connected to a housing of the manual control unit via a tension spring 84. The activation element 16 is directly or indirectly connected to the housing of the manual control unit 12 via a compression spring 68.

The activation element 14 can be readily activated. Since the activation element 14 is pulled counter to the force of the tension spring 84, the switch 74 closes first so that in this way the signal WUP is output to the microcontroller (see FIG. 1). This signal WUP serves as a wakeup signal if an ignition system is switched off. Likewise, it also serves as a redundant signal to the signal S1 which is subsequently generated by further pulling of the activation element 14, which signal S1 causes the parking brake to close owing to the closing of the switch 70. The activation of the switches 74, 70 takes place due to corresponding slopes 88, 90 on the activation element 14, which act on spring-prestressed momentary contact switches 92, 94 which are assigned to the switches 70, 74.

The activation element 16 can firstly be readily activated, specifically by virtue of the fact that it is pressed against the force of the compression spring 86. The slope 96 on the activation element 16 activates the spring-prestressed momentary contact switch 28 so that the switch 80 is closed. The trailer test function can be carried out in this way. However, if the activation element 16 is to be moved further, the slope 100 of the activation element 16 impacts against a blocking element, specifically a spring-centered sliding block 102. The activation element 16 can therefore not move any further. Only simultaneous activation of the activation element 14 causes an opening 104 in the activation element 14 to be arranged in such a way that the sliding block 102 is aligned with the opening 104. Consequently, the force which is exerted on the sliding block 102 by the activation element 16 causes the sliding block 102 to slide into the opening 104. After this sliding process has taken place, the activation element 16 is pressed further and, owing to the force effect of the slope 106 on the spring-prestressed momentary contact switch 108, it can activate the switch 72 to open the parking brake. Therefore, as a result of the activation of the activation element 16, the signals TEST and R1 are generated in succession, and the signal R1 can be generated here only after mechanical release of the sliding block 102 as a result of pulling out the activation element 14.

The manual control unit furthermore optionally includes an accumulator 110 and an assigned control unit 112. Furthermore, an LED 114 is provided, the LED 114 being able to output light signals 116 via a duct which extends in the axial direction of the activation element 16. Such light signals can, for example, request the driver to carry out the trailer test function. It is also contemplated for warning signals or status signals to be output by means of the light signals 116.

The features of the invention which are disclosed in the description above, in the drawings and in the claims may implement the invention either individually or else in any desired combination.

TABLE OF REFERENCE NUMERALS

10 Electronic control unit
12 Manual control unit
14 Activation element for closing the parking brake
16 Activation element for releasing the parking brake
18 Microcontroller
20 Analog/digital converter
22 Switching logic
24 Switch
26 Watchdog timer
28 Power unit
30 Redundant voltage supply
32 Shutdown relay
34 Parking brake pneumatics
36 Solenoid valve
38 EA pneumatic interface
40 Trailer control module
42 Spring-loaded cylinder
44 Electronic transmission controller
46 Electronic engine controller
48 Electronic brake controller
50 Brake pressure modulator
52 Central electronic control unit
54 CAN bus
56 CAN interface
58 CAN interface
60 Direct outputs
62 Pressure sensor
64 Pressure sensor
66 Pressure sensor
68 Pressure sensor
70 Switch
72 Switch
74 Switch
76 Schmitt trigger circuit
78 Coupling element for input voltage
80 Switch
82 Bolt
84 Tension spring
86 Tension spring
88 Slope
90 Slope
92 Momentary contact switch
94 Momentary contact switch
96 Slope
98 Momentary contact switch
100 Slope
102 Sliding block
104 Opening
106 Slope
108 Momentary contact switch
110 Accumulator
112 Controller
114 Light emitting diode
116 Light signal

The invention claimed is:

1. A device for controlling an electric parking brake of a utility vehicle, comprising:
an electronic control unit;
a manual control unit communicating with the electronic control unit and by which a driver's requests, which are dependent on an activation type of the manual control unit, are transmittable to the electronic control unit;
wherein the electronic control unit is operatively configured to process signals of the manual control unit if an ignition of the utility vehicle is switched on;
wherein the manual control unit is operatively configured such that in at least one type of activation, a wakeup signal is output to a microcontroller of the electronic control unit; and
wherein the electronic control unit, subsequent to the reception of the wakeup signal, further processes at least one further signal of the manual control unit even when the ignition of the utility vehicle is switched off, the wakeup signal causing a voltage supply of the microcontroller to be switched on.

2. The device as claimed in claim 1, wherein the manual control unit outputs the wakeup signal if an activation element for closing the parking brake is activated on the manual control unit.

3. The device as claimed in claim 2, wherein the electronic control unit, when the ignition of the utility vehicle is switched off, further processes precisely one further signal of the manual control unit subsequent to the reception of the wakeup signal.

4. The device as claimed in claim 3, wherein the further signal is a closing signal for closing the parking brake.

5. The device as claimed in claim 1, wherein:
the wakeup signal is fed to a microcontroller via an analog/digital converter and a switching logic, the electronic controller is operatively configured such that, in addition to the wakeup signal, an ignition on signal is fed to the switching logic; and an output signal of the switching logic causes a switch for supplying voltage to the microcontroller to close when at least one of the wakeup signal and the ignition on signal are supplied.

6. The device as claimed in claim 5, wherein the switch for supplying voltage to the microcontroller is closeable as a result of an output signal of the microcontroller.

7. A method for controlling an electric parking brake of a utility vehicle having an electronic control unit and a manual control unit, which communicates with the electronic control unit and by which driver's requests dependent on an activation type of the manual control unit are transmitted to the electronic control unit when the ignition of the utility vehicle is switched on, the method comprising the acts of:

outputting, by the manual control unit, a wakeup signal to a microcontroller of the electronic control unit in at least one type of activation; and subsequent to receiving the wakeup signal, further processing, by the electronic control unit, at least one further signal of the manual control unit even when the ignition of the utility vehicle is switched off; and wherein the wakeup signal causes the voltage supply of the microcontroller to switch on.

8. The method as claimed in claim 7, wherein the manual control unit outputs a wakeup signal if an activation element for closing the parking brake is activated on the manual control unit.

9. The method as claimed in claim 8, wherein, when the ignition of the utility vehicle is switched off, the electronic control unit further processes precisely one further signal of the manual control unit subsequent to the reception of the wakeup signal.

10. The method as claimed in claim 9, wherein the further signal is a closing signal for closing the parking brake.

11. The method as claimed in claim 7, wherein:

the wakeup signal is fed to a microcontroller via an analog/digital converter and a switching logic, in addition to the wakeup signal, an ignition on signal is fed to the switching logic; and an output signal of the switching logic causes a switch for supplying voltage to the microcontroller to close when at least one of the wakeup signal and the ignition on signal are fed.

12. The method as claimed in claim 11, wherein the switch for supplying voltage to the microcontroller is made to close as a result of an output signal of the microcontroller.

* * * * *